United States Patent [19]

Dearing

[11] Patent Number: 5,146,757
[45] Date of Patent: Sep. 15, 1992

[54] HELMET COOLING SYSTEM

[76] Inventor: David Dearing, 4945 Dana Dr., Kennesaw, Ga. 30144

[21] Appl. No.: 717,280

[22] Filed: Jun. 18, 1991

[51] Int. Cl.$^5$ .............................. A42B 3/02; B32B 3/00
[52] U.S. Cl. ........................................ 62/61; 62/259.3; 62/241; 2/6; 2/411
[58] Field of Search ................. 62/259.3, 241, 61; 98/2.11; 2/6, 7, 411

[56] References Cited

U.S. PATENT DOCUMENTS

| | | | |
|---|---|---|---|
| H902 | 4/1991 | Rousseau | 2/6 |
| 2,717,773 | 9/1955 | Gregg | 62/241 |
| 3,140,590 | 7/1964 | Gleockler | 62/259.3 |
| 3,223,086 | 12/1965 | Denton | 2/6 |
| 4,100,320 | 7/1978 | Chisun | 428/188 |

FOREIGN PATENT DOCUMENTS 0197708  8/1977  U.S.S.R. .............................. 62/259.3

Primary Examiner—Albert J. Makay
Assistant Examiner—William C. Doerrler
Attorney, Agent, or Firm—Hopkins & Thomas

[57] ABSTRACT

A helmet cooling system has a receptacle containing a coolant through which air flows, impelled by the velocity of the vehicle on which the system is used. The air is ducted from the receptacle to the interior of the helmet. A flexible conduit transmits melted coolant to a mouthpiece within the helmet for refreshing the helmet wearer.

16 Claims, 2 Drawing Sheets

HELMET COOLING SYSTEM

TECHNICAL FIELD

This invention relates to an air cooling arrangement, and, more particularly, to an air cooled safety or crash helmet for use by motorcyclists or bicyclists.

BACKGROUND OF THE INVENTION

Riders of various types of open wheeled vehicles, such as, for example, motorcycles, generally wear head protective helmets, and, in the case of racing vehicles, such as motorcycles, they are required to wear such helmets. While the helmets afford a large measure of head and neck protection, especially in those cases where there is a crash or the cyclist is unseated, they are heavy and also exhibit a high degree of heat retention. Thus, in the case of motorcycle racing, the rider tends to experience a great deal of discomfort from the retained heat, and both the heat and weight of the helmet result in premature tiring of the rider.

The present invention is primarily directed to that class of motorcyclists who are subjected to a great deal of heat and fatiguing activity, but it will be readily apparent from the following description that the present invention is readily adaptable for all types of cyclists, as well as automobile and truck drivers, and for those engaged in other pursuits as well.

Heretofore, there have been numerous arrangements for supplying cool air to a vehicle, such as an automobile. In U.S. Pat. No. 2,557,004 of Lepper, such a system is shown in which an ice containing receptacle receives air from the standard air inlets of a car via a conduit. The air passes over the ice and is discharged into the car interior through openings in the receptacle, which is carried in the front seat area of the car.

U.S. Pat. No. 2,802,347 of Marcus shows a similar system wherein the ice containing receptacle is carried in the trunk of the car, and contains a blower which draws air from the interior of the car into the receptacle and blows cooled air out into the interior of the car.

U.S. Pat. No. 2,915,885 of Reagan shows a system similar to that of Marcus, except the air is contained in conduits passing through the receptacle.

All of the aforementioned arrangements have drain means for draining off the water resulting from melting ice, as does a similar system shown in U.S. Pat. No. 3,250,317 of Sudduth.

Various arrangements also exist for applying cooled air to the actual person of the user. Thus, U.S. Pat. Nos. 4,405,348 and 4,459,822 of Pasternack, show cooling arrangements for use with heat protective suits. A liquid coolant is recirculated by means of a pump through conduits within the suit into an ice containing heat exchanger carried on the user's back. No means is supplied for disposing of the melted ice, which continues to act as a refrigerant.

In U.S. Pat. No. 3,140,590 of Gleockler, a face mask, such as a gas mask, cooling arrangement is shown wherein air drawn in through the typical respirator canister is passed through an ice containing receptacle before exiting into the mask adjacent the wearer's mouth and nose. The apparatus must be carried by the user, and appears to be both bulky and relatively heavy. Water from melted ice is drained off by removing the lid of the canister and tilting it to pour out the water.

As discussed heretofore, prior art cooling arrangements for cooling the user, and not just the ambient air, are bulky and heavy, and the air, or coolant, is circulated by means of a pump, also carried by the user, or by the user's own breathing. None of the arrangements are readily adaptable for use on a motorcycle, for example, and especially a racing motorcycle, wherein burdening or restricting the movement of the cyclist is to be avoided as much as possible. Nor do any of the prior art arrangements direct the cooling to the head of the user, where it is most desired.

In U.S. Pat. No. 3,458,415 of Natus, there is shown an arrangement for cooling the user's head by mounting the cooling device in the helmet or hat worn by the user. A tray containing a cooling agent, such as a refreezable gel, a saturated pad or sponge, or a Freon charged condenser coil is inserted into the helmet, and a battery powered blower, also contained in the helmet, blows air over the cooling member, thereby cooling the top of the user's head. Such an arrangement apparently produces a volume of cooling air directed onto the user's head, but adds to the weight that must be carried by the user. Such an arrangement is also of relatively low capacity, i.e. it does not circulate large volumes of air, nor is there any use made of the melted cooling agent.

SUMMARY OF THE INVENTION

The present invention, as adapted for example for use on a racing motorcycle, minimizes the amount of apparatus that is carried on the user's person, while ensuring a large, positive flow of cooling air to the driver's or user's head. Furthermore, the invention is designed, where ice is used as the cooling medium, to utilize the water from melted ice to achieve further cooling of the driver.

In a first preferred embodiment of the invention, as used on a motorcycle, the front face of the motorcycle fairing is provided with an air intake opening which, preferably, is screened to filter out pebbles and other road dirt. Directly behind the opening is mounted a receptacle adapted to contain a cooling medium, such as ice, through which the air from the intake passes. An outlet opening and neck are connected behind the motorcycle instrument panel to an opening therein formed by, for example, the removal of the motorcycle speedometer. As thus far described, air enters the screened air intake opening at a velocity dependent on the speed of the motorcycle, is cooled in the receptacle, and exits through the instrument panel opening.

A flexible hose is adapted to be coupled at one of its ends to the air outlet or to the instrument panel opening and is further adapted to be clipped by suitable means to the rider's arm and extend upward therealong to the rider's helmet. The other end of the hose is adapted to be coupled to an air inlet coupling at the rear base of the helmet, or it may be formed as an integral part of the helmet. First and second air ducts are formed on the inside of the crown of the helmet and open to the interior space defined by the helmet, approximately centrally thereof. Thus, when the rider is operating the motorcycle, cooled air is transmitted through the hose to the interior space between the rider's head and the inside crown of the helmet, and the flexible hose is prevented from flapping or interfering with the rider by being clipped or attached to his arm Racing motorcycles can be a grueling test of a rider's stamina, especially in the case of long distance or endurance races. To alleviate some of the distress the rider may suffer, the ice receptacle is provided with an outlet on the bottom for a small, flexible hose or conduit which is attached to the air hose and is substantially co-extensive therewith. At the helmet, this small hose is connected through a small water filter to a check valve. Extending from the check valve is a small, flexible hose having a mouthpiece on its distal or free end. In operation, the driver can carry the mouthpiece in his mouth and, as the ice melts, can at least moisten his mouth with cool water by sucking the water through the flexible hose. When not being used for drinking, the check valve allows the water in the hose to drip on the back of the rider's neck for cooling the rider inside the racing suit.

In all cases where the invention is to be used on a motorcycle or bicycle, it is necessary, as a safety precaution, to avoid tying the rider to the vehicle in any way. To this end, the hose connector between the cooling receptacle and the helmet is of a quick release type wherein it can simply be pulled off of the connection. In like manner, the small water hose connection between the cooling receptacle and the filter/valve arrangement is of the quick release type.

The various features and advantages of the present invention will be more readily understood from the following detailed description, as read in conjunction with the accompanying drawings.

DETAILED DESCRIPTION

Figure 1:
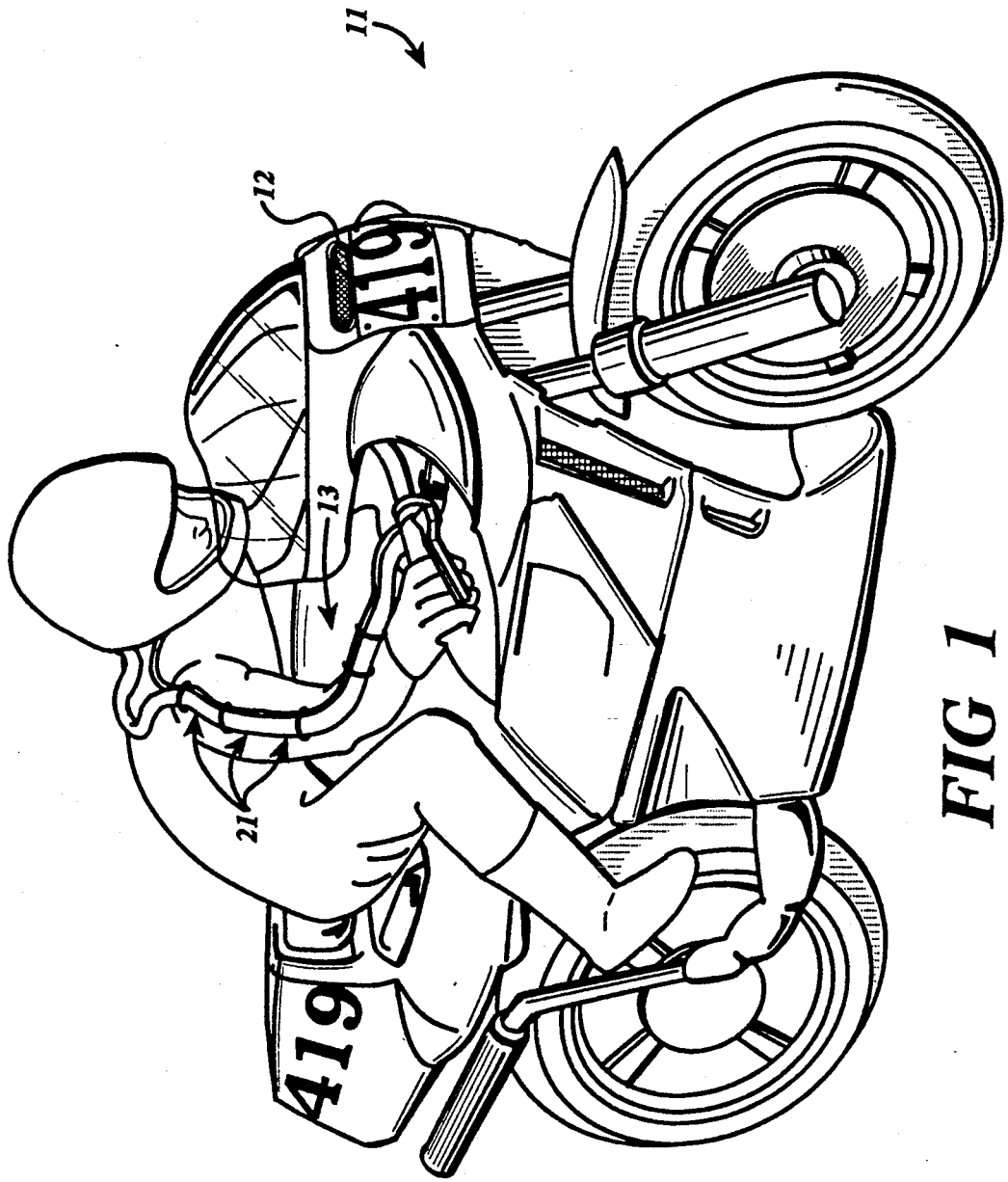
FIG. 1 is a perspective view of the cooling system of the present invention as mounted on a motorcycle.

FIG. 1 shows a motorcycle 11 having an air inlet 12 in the front fairing thereof. Air inlet 12 is preferably screened to prevent pebbles and dirt from getting in to the cooling system 13.

Figure 2:
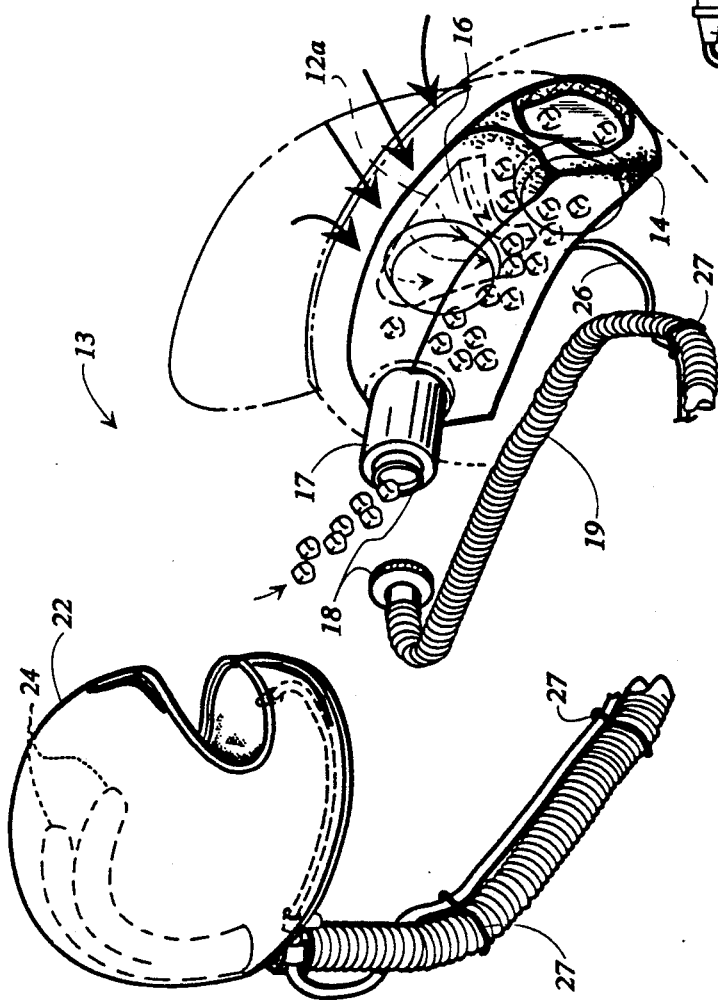
FIG. 2 is a perspective view of the cooling system of the present invention including the rider's helmet.

As best seen in FIG. 2, cooling system 13 comprises a receptacle 14 which is adapted to be mounted to the motorcycle directly behind the opening 12 in the fairing. Receptacle 14 is adapted to be connected to the opening 12 by means of a suitable duct 12a or it may be mounted sufficiently close to the opening 12 that air passing therethrough is immediately directed to an air passage 16 within receptacle 14, which opens into the receptacle. Receptacle 14 is adapted to be filled with a suitable air cooling medium, such as ice cubes, which surround passage 12 and cool the air passing therethrough, and the air within the receptacle. Ice cubes are introduced into receptacle 14 through a neck portion 17, which also functions as an air outlet for receptacle 14. Neck portion 17 is sufficiently large so that a volume of ice may be quickly introduced into the receptacle 14, as during a pit stop in a race. Neck portion 17 may be connected to the instrument panel of the motorcycle at the opening where the speedometer is normally located and is thereby easily accessible.

As thus far described, when the motorcycle is moving forward, air is drawn into inlet 12 and thence into receptacle 14 where it is cooled and is blown out through outlet neck 17, the velocity of air movement being related to the velocity of the motorcycle.

Connected to the distal end of outlet 17 by means of a suitable quick release connection 18 is a flexible air hose 19. Connection 18 may be any one of a number of commercially available quick release connections, designed to release when sufficient pulling force is exerted thereon. As best seen in FIG. 1, hose 19 is clipped to the driver's arm by suitable clipping means 21 which may for example, be made of Velcro ®. It is desirable that clips 21 hold the hose 19 to the driver's arm with sufficient strength to prevent the hose 19 from being torn loose by wind velocity for example, yet be of such a nature as to permit flexing and movement of the driver's arm. Alternatively, the hose 19 may pass up the driver's arm inside his sleeve.

Figure 3:
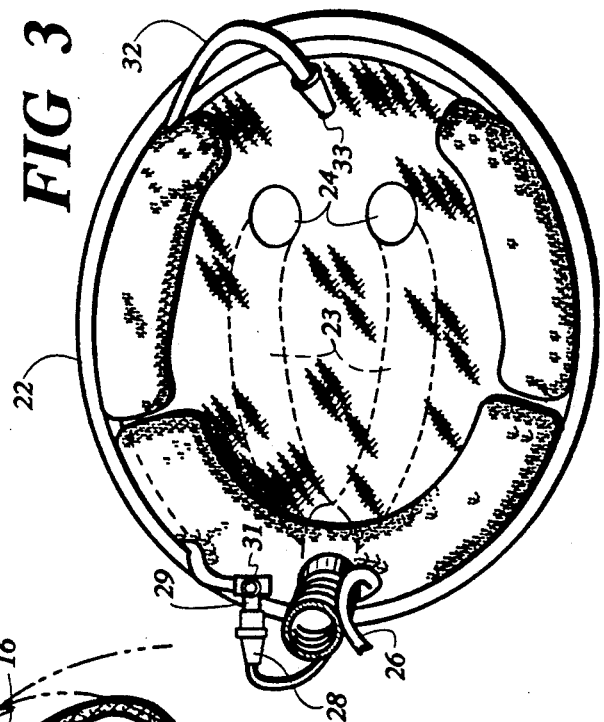
FIG. 3 is a plan view of the underside of the helmet showing the cool air and cool water connections.

As best seen in FIGS. 2 and 3, flexible hose 19 is connected to the helmet 22 by suitable means, not shown, or it may be formed as an integral part of helmet 22. Hose 19 preferably enters or is coupled to helmet 22 at the rear, behind the driver's neck, and connects to one or more air ducts 23 within the helmet 22, located on the underside of the crown, which open into the interior of the helmet at openings 24. Thus, cold air from neck 17 is directed up hose 19 into ducts 23 and into the inside of the helmet over the driver's head by openings 24.

In most motorcycle racing, but especially in long distance races, the rider can develop quite a thirst. In the arrangement of the present invention, at least partial alleviation of this thirst is achieved by means of a flexible tube 26 which is connected to the bottom of receptacle 14 by a suitable quick release coupling, not shown. Tube 26 is clipped to hose 19 along its length by means of suitable clips 27, and enters a small water filter 28 attached to the helmet 22. The outlet 29 of filter 28 is connected to a check valve 31 and to a length of tubing 32, the distal end of which terminates in a mouthpiece 33. As the ice in receptacle 14 melts, it creates a supply of cold water which may be sucked by the driver into his mouth through tube 26, filter 28, outlet, 29, valve 31, tube 32, and mouthpiece 33, thereby slaking his thirst. The water in the tube 32 may, when not being drawn into the rider's mouth, be allowed by the check valve 31 to let cool water drip down his neck, or over a portion of his clothing, to ease some of the discomfort resulting from excess heat.

The principles of the invention and the components thereof have been described in an illustrative embodiment for use with a motorcycle. The principles of the invention are equally applicable to other types of vehicles with minor changes in the apparatus. Numerous other arrangements may occur to workers in the art without departing from the spirit and scope of the invention.

I claim:

1. An air cooled helmet system for use by the rider of a vehicle comprising:
    a helmet;
    a receptacle having an air inlet means and an air outlet means and a lower portion, said receptacle being adapted to contain an air cooling medium;
    air transmission means for conveying air from said air outlet means to the helmet; and
    flexible conduit means having first and second ends with said first end being connected to said lower portion of said receptacle and being connected adjacent its second end to said helmet.

2. An air cooled helmet system as claimed in claim 1 wherein said air transmission means comprises a flexible hose having one end connected to said air outlet means and having its other end terminating in said helmet.

3. An air cooled helmet system as claimed in claim 2 wherein said one end is connected to said air outlet means by a quick release coupling.

4. An air cooled helmet system as claimed in claim 1 and further comprising means for attaching said air transmission means to the rider.

5. An air cooled helmet system for use by the rider of a vehicle comprising:
- a receptacle having an air inlet means and an air outlet means, said receptacle being adapted to contain an air cooling medium having a liquid phase;
- said receptacle having a bottom portion wherein the liquid cooling medium collects;
- air transmission means for conveying air from said air outlet means to the helmet;
- means within said helmet for distributing the air received from said air transmission means over the rider's head; and
- flexible conduit means having a proximal end connected to said bottom portion of said receptacle and having a distal end connected to the helmet.

6. An air cooled helmet system as claimed in claim 5 wherein said flexible conduit means is connected to said air transmission means along at least a portion of the length thereof.

7. An air cooled helmet system as claimed in claim 5 wherein a filter means having an inlet and an outlet is carried by the helmet.

8. An air cooled helmet system as claimed in claim 7 wherein the distal end of said flexible conduit means is connected to the inlet of said filter.

9. An air cooled helmet system as claimed in claim 8 wherein a second flexible conduit means is connected at a first end to the outlet of said filter.

10. An air cooled helmet system as claimed in claim 9 wherein a mouthpiece is connected to a second end of said second flexible conduit means.

11. An air cooled helmet system as claimed in claim 9 wherein a check valve is connected between the outlet of said filter and said first end of said second flexible conduit means.

12. For use on a motorcycle having a front portion having an air inlet and an instrument panel having an opening therein;
an air cooled helmet system comprising:
- a helmet having front and rear portions;
- a receptacle having an air inlet and an air outlet adapted to be mounted on said motorcycle with said air inlet connected to the air inlet of the motorcycle front portion and with said air outlet connected to the opening in the instrument panel;
- said receptacle being adapted to contain a cooling medium and having a lower portion;
- flexible air transmission means having a first end connected to the opening in the instrument panel for receiving air from said air outlet, and having a second end connected to said helmet at the rear portion thereof;
- means for connecting said air transmission means to the rider along at least a portion of the length thereof;
- means in said helmet for distributing air received through said air transmission means towards said front portion of said helmet; and,
- flexible conduit means having first and second ends with said first end connected to said lower portion of said receptacle and being connected adjacent said second end to said helmet.

13. An air cooled helmet system as claimed in claim 12 wherein said conduit means is connected to said air transmission means at a plurality of spaced points.

14. An air cooled helmet system as claimed in claim 12 wherein said conduit means is connected adjacent its second end to the input of a filter means mounted on said helmet.

15. An air cooled helmet system as claimed in claim 14 wherein a check valve is connected between the output of said filter means and said second end of said conduit means.

16. An air cooled helmet system as claimed in claim 12 wherein said second end of said flexible conduit has a mouthpiece mounted thereon.

* * * * *